United States Patent
Nihashi et al.

(10) Patent No.: US 12,214,334 B2
(45) Date of Patent: Feb. 4, 2025

(54) SUPPORTED CATALYST PARTICLES

(71) Applicants: CATALER CORPORATION, Kakegawa (JP); TOYOTA JIDOSHA KABUSHIKI KAISHA, Toyota (JP)

(72) Inventors: Hiroki Nihashi, Kakegawa (JP); Shogo Kawamura, Kakegawa (JP); Tomomasa Aikawa, Kakegawa (JP); Isao Naito, Kakegawa (JP); Shogo Shirakawa, Toyota (JP); Masahide Miura, Toyota (JP); Nobuyuki Takagi, Toyota (JP); Norimichi Shimano, Toyota (JP)

(73) Assignees: CATALER CORPORATION, Kakegawa (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 658 days.

(21) Appl. No.: 17/435,007

(22) PCT Filed: Feb. 12, 2020

(86) PCT No.: PCT/JP2020/005392
§ 371 (c)(1),
(2) Date: Aug. 30, 2021

(87) PCT Pub. No.: WO2020/175142
PCT Pub. Date: Sep. 3, 2020

(65) Prior Publication Data
US 2022/0134313 A1 May 5, 2022

(30) Foreign Application Priority Data
Feb. 28, 2019 (JP) .................... 2019-035818

(51) Int. Cl.
| | | |
|---|---|---|
| *B01J 23/46* | (2006.01) | |
| *B01J 21/04* | (2006.01) | |
| *B01J 21/06* | (2006.01) | |
| *B01J 35/02* | (2006.01) | |
| *B01J 35/40* | (2024.01) | |
| *B01J 37/04* | (2006.01) | |
| *B01J 37/08* | (2006.01) | |

(52) U.S. Cl.
CPC ............ *B01J 23/464* (2013.01); *B01J 21/04* (2013.01); *B01J 21/066* (2013.01); *B01J 35/40* (2024.01); *B01J 37/04* (2013.01); *B01J 37/08* (2013.01)

(58) Field of Classification Search
CPC . B01J 23/464; B01J 35/40; B01J 21/04; B01J 21/066; B01J 37/04; B01J 37/08
See application file for complete search history.

(56) References Cited

U.S. PATENT DOCUMENTS

| | | | |
|---|---|---|---|
| 2009/0317289 A1 | 12/2009 | Ito et al. | |
| 2010/0234623 A1* | 9/2010 | Haruta | B01J 29/89 549/523 |
| 2011/0005473 A1* | 1/2011 | Ishikawa | C01B 3/0015 123/3 |
| 2014/0323785 A1* | 10/2014 | Lande | B01J 37/0207 502/223 |
| 2019/0193065 A1 | 6/2019 | Shirakawa et al. | |

FOREIGN PATENT DOCUMENTS

| | | |
|---|---|---|
| CN | 102728356 A | 10/2012 |
| CN | 104801316 A | 7/2015 |
| DE | 198 52 547 A1 | 5/2000 |
| JP | 2007-038085 A | 2/2007 |
| JP | 2008-031554 A | 2/2008 |
| JP | 2010-215534 A | 9/2010 |
| JP | 2016-147256 A | 8/2016 |
| JP | 2017-164735 A | 9/2017 |
| JP | 2019-111511 A | 7/2019 |

OTHER PUBLICATIONS

Feb. 1, 2022 Office Action issued in Japanese Patent Application 2021-501891.
Vlaic, G. et al., "Morphology of Rhodium Particles in Ex-chloride Rh/Ce0.5Zr0.5O2 Catalyst", Journal of Catalysis, Feb. 15, 2000, vol. 190, pp. 182-190.
Mar. 24, 2020 International Search Report issued in International Patent Application No. PCT/JP2020/005392.
Mar. 24, 2020 Written Opinion issued in International Patent Application No. PCT/JP2020/005392.
Oct. 26, 2022 Search Report issued in European Patent Application No. 20762311.7.
B. Didillon et al. "From Colloidal Particles to Supported Catalysts: A Comprehensive Study of Palladium Oxide Hydrosols Deposited on Alumina". Zeolites and Related Materials: Trends, Targets, and Challenges, [Studies in Surface Science and Catalysis; ISSN 0167-2991], Elsevier BV, NL, vol. 118, Jan. 1, 1998, pp. 41-54.
Irene E. Beck et al. "Platinum Nanoparticles on Al2O3: Correlation Between The Particle Size and Activity in Total Methane Oxidation". Journal of Catalysis, Academic Press, Duluth, MN, US, vol. 268, No. 1, Nov. 15, 2009, pp. 60-67.

* cited by examiner

*Primary Examiner* — Yong L Chu
(74) *Attorney, Agent, or Firm* — Oliff PLC

(57) ABSTRACT

A supported catalyst particles include oxide carrier particles and noble metal particles supported on the oxide carrier particles, wherein the mass of the noble metal particles is less than or equal to 5 mass % based on the mass of the oxide carrier particles, and the average particle size of the noble metal particles measured by transmission electron microscopy is 1.0-2.0 nm, with the standard deviation $\sigma$ less than or equal to 0.8 nm.

5 Claims, 2 Drawing Sheets

[FIG. 1]
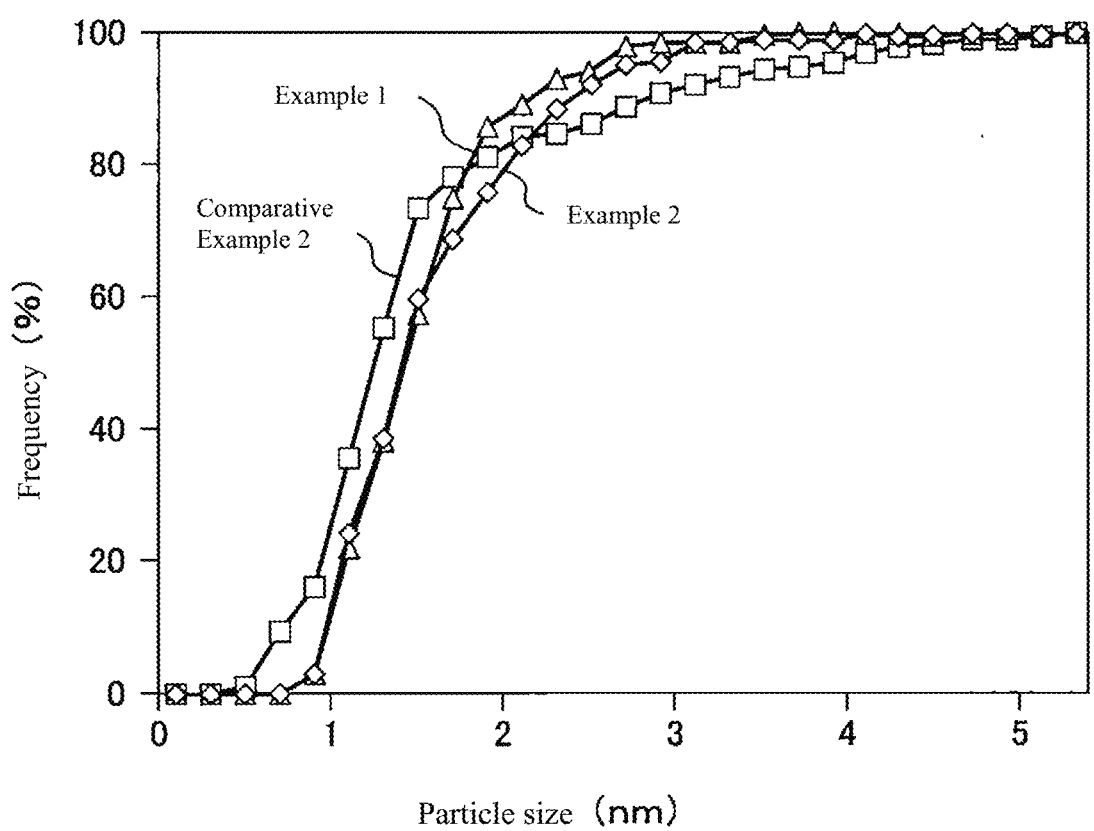

[FIG. 2]
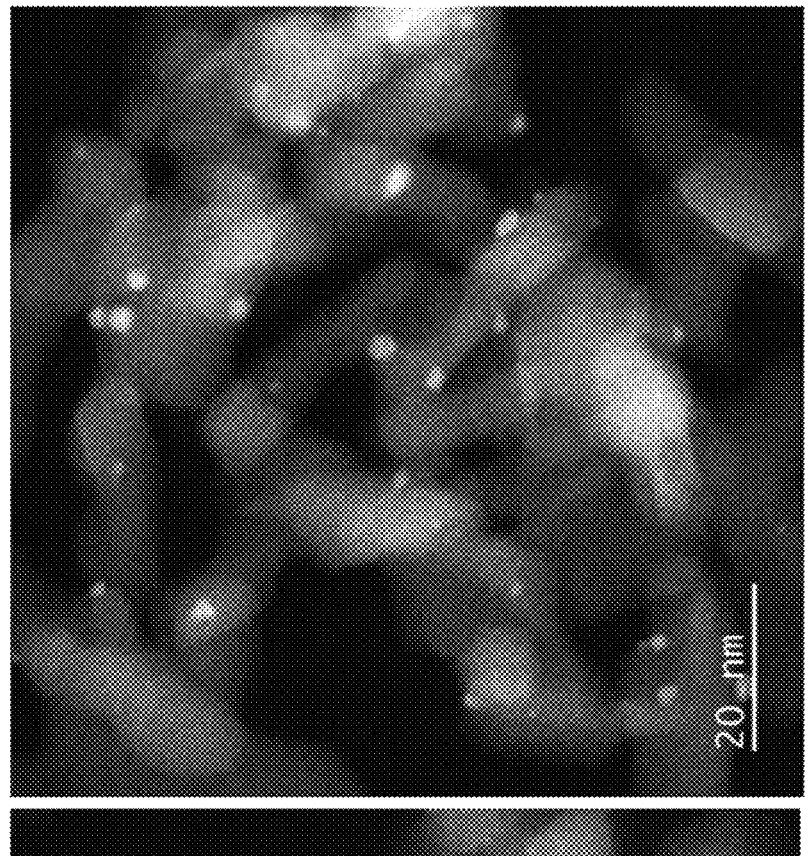
(a) Example 1
(b) Comparative Example 2

SUPPORTED CATALYST PARTICLES

FIELD

The present invention relates to a supported catalyst particle.

BACKGROUND

Catalysts for exhaust gas purification and fuel cell electrodes are often used as supported catalysts, in which a noble metal having catalytic activity is supported as microparticles on carriers.

From the viewpoint of the effective utilization of an expensive noble metal, decreasing the particle size and increasing the surface area of the noble metal particles in such supported catalysts are desirable. However, if the particle size of the noble metal particles is excessively small, aggregation of the particles during a catalytic reaction is likely to occur, impairing catalytic activity and catalyst lifespan.

Therefore, controlling the particle size of the supported noble metal particles in the supported catalysts within a desired range is important.

As a simple method for producing supported catalyst particles, a method has been known in which a carrier is impregnated in an aqueous noble metal salt solution and thereafter dried and fired to decompose the noble metal salt, which is then supported as noble metal particles on the carrier. This method tends to produce noble metal particles having an average particle size of less than 1.0 nm and a wide particle size distribution, and the control of the particle size of the noble metal particles is difficult.

PTL 1 discloses a method for producing a catalyst, which comprises supporting noble metal particles on an oxide carrier to obtain a noble metal supported catalyst and heat-treating the noble metal supported catalyst in a reducing atmosphere to control the particle size of the noble metal within a predetermined range. PTL 1 describes in the Examples that when 5 to 15% by mass of Pt, 10% by mass of Pd, or 10% by mass of Rh with respect to the whole catalyst is supported on an oxide carrier, the particle size of the noble metal particles can be controlled within the range of 2.8 to 3.8 nm.

PTL 2 discloses a method for producing a catalyst, which comprises allowing an alcohol-based reducing agent to act on a noble metal supported catalyst, in which noble metal particles are supported on an oxide carrier, to enlarge noble metal microparticles having a small particle size to obtain noble metal microparticles having a minimum particle size of 1 nm or greater. PTL 2 describes in the Examples that when Pt or Pd is supported on an oxide carrier, the particle size of the noble metal particles can be controlled within 3.0 nm to 4.1 nm.

CITATION LIST

Patent Literature

[PTL 1] Japanese Unexamined Patent Publication (Kokai) No. 2016-147256
[PTL 2] Japanese Unexamined Patent Publication (Kokai) No. 2007-38085

SUMMARY

Technical Problem

The object of the present invention is to provide a supported catalyst particle, in which the particle size distribution of the noble metal particles is controlled and the presence ratios of fine and coarse noble metal particles are small in a noble metal supported catalyst having a comparatively small supported amount and a comparatively small average particle size of the noble metal particles.

Solution To Problem

The present invention is described as follows.

Aspect 1

A supported catalyst particle, comprising
an oxide carrier particle and noble metal particles supported on the oxide carrier particle,
wherein the noble metal particles have a mass of 5.0% by mass or less based on the mass of the oxide carrier particle, and
the noble metal particles have an average particle size of 1.0 nm to 2.0 nm with a standard deviation $\sigma$ of 0.8 nm or less, as measured by observation with a transmission electron microscope.

Aspect 2

The supported catalyst particle according to Aspect 1, wherein the noble metal particles have a particle size standard deviation $\sigma$ of 0.6 nm or less.

Aspect 3

The supported catalyst particle according to Aspect 1 or 2, wherein the noble metal particles have an average particle size of 1.2 nm to 1.8 nm and a presence ratio of the noble metal particles having a particle size of less than 1.0 nm is 5.0% by mass or less with respect to the total mass of the noble metal particles.

Aspect 4

The supported catalyst particle according to any one of Aspects 1 to 3, wherein a noble metal constituting the noble metal particles is selected from rhodium, palladium, and platinum.

Aspect 5

The supported catalyst particle according to Aspect 4, wherein the noble metal constituting the noble metal particles is selected from rhodium and platinum, and the noble metal particles have a mass of 1.0% by mass or less based on the mass of the oxide carrier particle.

Aspect 6

The supported catalyst particle according to any one of Aspects 1 to 5, wherein the oxide carrier particle is a particle of an oxide of one or more metals selected from titanium, zirconium, cerium, and aluminum.

Aspect 7

A noble metal particle precursor dispersion, containing a liquid medium and a noble metal particle precursor dispersed in the liquid medium, wherein the noble metal particle precursor has a medium diameter (D50) of 1.4 nm to 2.9 nm, as measured by dynamic light scattering and when bringing the noble metal particle dispersion into contact with alumina followed by firing to produce a supported catalyst particle having alumina and noble metal particles on the alumina, the noble metal particles having a mass of 5.0% by mass or less based on the mass of the alumina, the noble metal particles of the supported catalyst particle have an average particle size of 1.0 nm to 2.0 nm with a standard deviation σ of 0.8 nm or less, as measured by observation with a transmission electron microscope.

Aspect 8

The noble metal particle precursor dispersion according to Aspect 7, wherein the noble metal particles in the supported catalyst particle have an average particle size of 1.2 nm to 1.8 nm and a presence ratio of noble metal particles having a particle size of less than 1.0 nm is 5.0% by mass or less with respect to the total mass of the noble metal particles.

Aspect 9

The noble metal particle precursor dispersion according to Aspect 7 or 8, wherein the noble metal particle precursor is a hydroxide of a noble metal.

Aspect 10

A method for producing the supported catalyst particle according to any one of Aspects 1 to 6, comprising
bringing the oxide carrier particle into contact with the noble metal particle precursor dispersion according to any one of Aspects 7 to 9, followed by firing.

Advantageous Effects of Invention

The present invention provides a supported catalyst particle, in which the particle size distribution of the noble metal particles is controlled and the presence ratios of fine and coarse noble metal particles are small in a noble metal supported catalyst having a comparatively small supported amount and a comparatively small average particle size of the noble metal particles.

The supported catalyst particle of the present invention can be suitably applied as, for example, an exhaust gas purification catalyst for purifying exhaust gas from automobiles.

BRIEF DESCRIPTION OF DRAWINGS

FIG. 1 is a graph showing the particle size distributions (cumulative frequencies) of rhodium particles on rhodium supported catalyst particles obtained in Examples 1 and 2 and Comparative Example 2.

FIG. 2(a) is a STEM image of rhodium supported catalyst particles obtained in Example 1.

FIG. 2(b) is a STEM image of rhodium supported catalyst particles obtained in Comparative Example 2.

DESCRIPTION OF EMBODIMENTS

The supported catalyst particle of the present invention comprises an oxide carrier particle and noble metal particles supported on the oxide carrier particle, wherein the noble metal particles have a mass of 5.0% by mass or less based on the mass of the oxide carrier particle, and the noble metal particles have an average particle size of 1.0 nm to 2.0 nm with a standard deviation σ of 0.8 nm or less, as measured by observation with a transmission electron microscope.

The supported catalyst particle of the present invention has a comparatively small supported amount of noble metal particles and a comparatively small average particle size and a narrow particle size distribution of noble metal particles.

The supported catalyst particle of the present invention has a small average particle size of supported noble metal particles, and thus exhibits a significantly large specific surface area and high catalytic activity even with a small supported amount of noble metal particles.

In the supported catalyst particle of the present invention, noble metal particles have a narrow particle size distribution and the proportions of coarse particles and fine particles are small. Coarse noble metal particles are considered to have a small effective surface area and inferior catalytic activity. Therefore, the supported catalyst particle of the present invention having a small proportion of coarse noble metal particles is able to exhibit high catalytic activity. Fine noble metal particles are considered to aggregate and coarsen during a catalytic reaction, impairing catalytic activity. Therefore, the supported catalyst particle of the present invention having a small proportion of fine noble metal particles is able to maintain high catalytic activity for a long period of time.

Such a supported catalyst particle of the present invention can be produced by a method for producing a supported catalyst particle, comprising, for example, bringing an oxide carrier particle into contact with a noble metal particle precursor dispersion containing noble metal particles controlled to a predetermined particle size distribution in advance, followed by firing.

According to the method for producing a supported catalyst particle of the present invention, the noble metal particle precursor, which becomes noble metal particles via firing, is controlled in advance to have a predetermined particle size distribution. Thus, the particle size of the noble metal particles in the supported catalyst particle and the distribution thereof can be easily and reliably controlled.

The noble metal particle precursor dispersion containing the noble metal particle precursor having a controlled particle size distribution, as described above, can be produced, for example, by one of the following methods:

(1) a method for producing the noble metal particle precursor dispersion, comprising reacting an acidic solution of a noble metal compound with a basic solution in a reactor in which a reaction field clearance is set to a predetermined range (Method 1), and (2) a method for producing the noble metal particle precursor dispersion, comprising mixing and reacting an acidic solution of a noble metal compound with a basic solution, and thereafter, stir-processing in a high-speed mixer (Method 2).

Method 1 is a method of controlling the average particle size and particle size distribution of the obtained noble metal particle precursor, by setting the reaction field clearance to a predetermined range when reacting an acidic solution of the noble metal compound with a basic solution, to produce the noble metal particle precursor.

Method 2 is a method of controlling the average particle size and particle size distribution of the noble metal particle precursor after dispersion, by applying a strong shear force to the noble metal particle precursor generated as large particle-size particles by the reaction of an acidic solution of the noble metal compound and a basic solution to disperse the noble metal particle precursor.

The particle sizes of supported catalyst particles, oxide carrier particles, and noble metal particles in the present specification are number average particle sizes obtained by measuring the circular equivalent diameters projected directly onto images taken in observation with a scanning electron microscope (SEM) and a transmission electron microscope (TEM), and analyzing particle groups of 100 or more aggregates. In the present specification, the concept of transmission electron microscope (TEM) includes scanning transmission electron microscope (STEM).

The particle size of the noble metal particle precursor in the noble metal particle precursor dispersion is a particle size having a cumulative relative frequency of 50% in the particle size distribution measured by dynamic light scattering. This particle size is also called "median diameter" or "D50".

The present invention will be described in detail hereinafter.

<<Supported Catalyst Particle>>

The supported catalyst particle of the present invention comprises
  an oxide carrier particle and noble metal particles supported on the oxide carrier particle,
  wherein the noble metal particles have a mass of 5.0% by mass or less based on the mass of the oxide carrier particle, and
  the noble metal particles have an average particle size of 1.0 nm to 2.0 nm with a standard deviation σ of 0.8 nm or less, as measured by observation with a transmission electron microscope.

<Oxide Carrier Particle>

The oxide carrier particle of the supported catalyst particle of the present invention may be, for example, a particle of an oxide of a metal. The metal contained in the metal oxide may be, for example, one or more of metals selected from group 3, group 4, and group 13 of the periodic table. When oxides of two or more metals constitute oxide carrier particles, the oxide carrier particles may be a mixture of two or more metal oxides, a composite oxide comprising two or more metals, or a mixture of one or more metal oxides and one or more composite oxides.

The metal oxide constituting the oxide carrier particle may be specifically one or more metals selected from, for example, scandium, yttrium, cerium, neodymium, samarium, europium, lutetium, titanium, zirconium, and aluminum, and is preferably an oxide of one or more metals selected from titanium, zirconium, cerium, and aluminum.

The particle size of the oxide carrier particle may be appropriately set by a person skilled in the art in accordance with the intended purpose thereof.

<Noble Metal Particles>

The noble metal particles of the supported catalyst particle of the present invention are supported on an oxide carrier particle.

(Noble Metal)

The noble metal constituting the noble metal particles of the supported catalyst particle of the present invention may be one or more selected from rhodium, palladium, and platinum. When two or more noble metals constitute the noble metal particles, the noble metal particles may comprise particles of each individual noble metal, may be particles of an alloy of two or more noble metals, or may comprise particles of one or more elemental noble metals and particles of an alloy of two or more noble metals.

(Supported Amount of Noble Metal Particles)

The supported amount of noble metal particles of the supported catalyst particle of the present invention is 5.0% by mass or less, as a mass ratio of the noble metal particles based on the mass on the oxide carrier particle. The production cost of the supported catalyst particle can be reduced by limiting the supported amount of noble metal particles to 5.0% by mass or less. Since the surface area of the noble metal particles can be sufficiently increased by adjusting the average particle size of the noble metal particles to 1.0 nm to 2.0 nm, as specified in the present invention, high catalytic activity is exhibited even when the supported amount of noble metal particles is limited to 5.0% by mass or less. The supported amount of the noble metal particles, as a mass ratio of the noble metal particles based on the mass of the oxide carrier particle, may be 4.0% by mass or less, 3.0% by mass or less, 2.0% by mass or less, 1.0% by mass or less, 0.7% by mass or less, 0.5% by mass or less, 0.3% by mass or less, or 0.2% by mass or less.

From the viewpoint of ensuring high catalytic activity, the supported amount of the noble metal particles in the supported catalyst particle of the present invention, as a mass ratio of noble metal particles based on the mass of the oxide carrier particle, may be 0.01% by mass or greater, 0.02% by mass or greater, 0.05% by mass or greater, 0.07% by mass or greater, 0.1% by mass or greater, 0.2% by mass or greater, 0.3% by mass or greater, 0.4% by mass or greater, 0.5% by mass or greater, 0.6% by mass or greater, 0.7% by mass or greater, or 0.8% by mass or greater.

When rhodium or platinum, among noble metals, is applied to, for example, an exhaust gas purification catalyst, very high catalytic activity is exhibited. Therefore, when the supported catalyst particle of the present invention comprises noble metal particles selected from rhodium and platinum, the supported amount of noble metal particles may be comparatively small. From this viewpoint, when the noble metal constituting the noble metal particles in the supported catalyst particle of the present invention is selected from rhodium and platinum, the supported amount of the noble metal particles, based on the mass of the oxide carrier particle, may be 1.0% by mass or less, 0.7% by mass or less, 0.5% by mass or less, 0.3% by mass or less, or 0.2% by mass or less. In this case, the supported amount of noble metal particles, based on the mass of the oxide carrier particle, may be 0.01% by mass or greater, 0.02% by mass or greater, 0.05% by mass or greater, 0.07% by mass or greater, 0.1% by mass or greater, or 0.2% by mass or greater.

When palladium is applied to, for example, an exhaust gas purification catalyst, ensuring a certain supported amount is necessary in order to exhibit significantly high catalytic activity. From this viewpoint, when the noble metal constituting the noble metal particles in the supported catalyst particle of the present invention comprises palladium, the supported amount of the noble metal particles, based on the mass of the oxide carrier particle, may be 0.3% by mass or greater, 0.4% by mass or greater, 0.5% by mass or greater, 0.6% by mass or greater, 0.7% by mass or greater, or 0.8% by mass or greater. In this case, the supported amount of noble metal particles, based on the mass of the oxide carrier particle, may be 5.0% by mass or less, 4.0% by mass or less, 3.0% by mass or less, 2.0% by mass or less, or 1.0% by mass or less.

(Particle Size of Noble Metal Particles)

The average particle size (number average particle size) of the noble metal particles in the supported catalyst particle of the present invention, as measured by observation with a transmission electron microscope, is 1.0 nm to 2.0 nm with a particle size distribution standard deviation σ of 0.8 nm or less. By setting the average particle size of the noble metal particles to 1.0 nm or greater, the proportion of fine particles having a particle size of less than 1.0 nm that aggregate during catalytic reaction can be reduced, and high activity of the supported catalyst particles can be maintained for a long period of time. By setting the average particle size of the noble metal particles to 2.0 nm or less, surface area of the noble metal particles and catalytic activity can be increased. The average particle size of the metal particles may be 1.1 nm or greater or 1.2 nm or greater, and may be less than 2.0 nm, 1.9 nm or less, or 1.8 nm or less.

The particle size standard deviation σ of the noble metal particles in the supported catalyst particle of the present invention, as measured by observation with a transmission electron microscope, is 0.8 nm or less. Since the particle size standard deviation σ of the noble metal particles in the supported catalyst particle of the present invention is 0.8 nm or less, the particle size distribution has a steep slope and the content ratios of fine particles and coarse particles are low. Since the amount of fine noble metal particles is small, aggregation of the noble metal particles during catalytic reaction is suppressed, and a long catalyst lifespan is obtained. Since the amount of coarse noble metal particles is small, the surface area of the noble metal particles becomes larger, and catalytic activity is improved.

The particle size standard deviation σ of the noble metal particles may be 0.7 nm or less, 0.6 nm or less, or 0.5 nm or less. The particle size of the noble metal particles may be monodisperse, but the effect of the present invention can be realized even if the standard deviation σ is approximately 0.2 nm or greater, 0.3 nm or greater, or 0.4 nm or greater.

The noble metal particles in the supported catalyst particle of the present invention, specifically, the proportion of fine particles having a particle size of less than 1.0 nm is reduced. Since aggregation of the noble metal particles during catalytic reaction is suppressed due to a small proportion of fine particles having a particle size of less than 1.0 nm, high activity of the supported catalyst particle can be maintained for a long period of time. The supported catalyst particle of the present invention has a presence ratio of noble metal particles having a particle size of less than 1.0 nm, with respect to the total mass of the noble metal particles, of 5% by mass or less, or may have a presence ratio of 4% by mass or less, 3% by mass or less, 2% by mass or less, 1% by mass or less, 0.5% by mass or less, 0.3% by mass or less, or 0.1% by mass or less, or may be entirely free of fine particles.

The noble metal particles in the supported catalyst particle of the present invention may typically have an average particle size of 1.2 nm to 1.8 nm, as measured by a transmission electron microscope, and a presence ratio of noble metal particles having a particle size of less than 1.0 nm of 5.0% by mass or less with respect to the total mass of the noble metal particles.

<<Method for Producing Supported Catalyst Particle>>

The supported catalyst particle of the present invention may be produced, for example, by a method for producing a supported catalyst particle, comprising bringing the desired oxide carrier particle into contact with a predetermined noble metal particle precursor dispersion, followed by firing.

<Noble Metal Particle Precursor Dispersion>

The noble metal particle precursor dispersion used in the method for producing the supported catalyst particle of the present invention is a noble metal particle precursor dispersion containing a liquid medium and a noble metal particle precursor dispersed in the liquid medium,
wherein the noble metal particle precursor has a medium diameter (D50), as measured by dynamic light scattering, of 1.4 nm to 2.9 nm, and
when bringing the noble metal particle dispersion into contact with alumina followed by firing to produce a supported catalyst particle having alumina and noble metal particles on the alumina, the noble metal particles having a mass of 5.0% by mass or less based on the mass of the alumina,
the noble metal particles of the supported catalyst particle have an average particle size of 1.0 nm to 2.0 nm with a standard deviation σ of 0.8 nm or less, as measured by observation with a transmission electron microscope.

As such, the noble metal particles in the hypothetical supported catalyst particle may be the same as the noble metal particles in the supported catalyst particle of the present invention. Therefore, the average particle size thereof may be 1.2 nm to 1.8 nm, and the presence ratio of the noble metal particles having a particle size of less than 1.0 nm may be 5.0% by mass or less with respect to the total mass of the noble metal particles.

The noble metal particle precursor dispersion in the present invention contains a noble metal particle precursor of a controlled particle size distribution. The particle size and particle size distribution of the noble metal particle precursor in the noble metal particle precursor dispersion can be measured, for example, by dynamic light scattering. The median diameter (D50) of the noble metal particle precursor, measured by dynamic light scattering, may be, for example, 1.4 nm or greater, 1.6 nm or greater, 1.8 nm or greater, or 2.0 nm or greater, and may be, for example, 2.9 nm or less, 2.8 nm or less, 2.7 nm or less, 2.6 nm or less, 2.5 nm or less, or 2.4 nm or less.

The particle size distribution of the noble metal particle precursor contained in the noble metal particle precursor dispersion in the present invention is controlled. Specifically, when bringing the noble metal particle dispersion into contact with alumina followed by firing to produce a supported catalyst particle having alumina and noble metal particles on the alumina, the noble metal particles having a mass of 5.0% by mass or less based on the mass of the alumina, the presence ratios of a fine noble metal particle precursor to become fine noble metal particles having a particle size of less than 1.0 nm and a large particle-size noble metal particle precursor to become large particle-size noble metal particles having inferior catalytic activity are reduced.

The average particle size (median diameter) of the noble metal particle precursor in the noble metal particle precursor dispersion can be measured by dynamic light scattering. However, in dynamic light scattering, it is not easy to verify that the noble metal particle precursor in the noble metal particle precursor dispersion has a controlled particle size distribution. Specifically, since the resolution of the small particle-size region of 1.0 nm or less is limited, the distinction between the noble metal particle precursor dispersion of the present invention and a precursor dispersion of the prior art is difficult. Therefore, it is considered appropriate to specify the noble metal particle precursor dispersion in the present invention by the particle size and particle size distribution of the noble metal particles in the hypothetical supported catalyst particle as described above, or by the production method described below, in order to distinguish from a precursor dispersion in the prior art.

The noble metal particle precursor contained in the noble metal particle precursor dispersion in the present invention may be a hydroxide of a noble metal. This hydroxide of a noble metal, other than the typical case in which a noble metal ion is bonded to a number of hydroxyl groups equal to the number of charges of the noble metal ion, may partly include a noble metal-noble metal bond, may partly include a noble metal-oxygen atom-noble metal bond, or may partly include a noble metal-organic group bond.

The dispersion medium of the noble metal particle precursor dispersion of the present invention is preferably an aqueous medium, may be water or a mixture of water and an aqueous organic solvent, and may typically be water.

<Production Method of Noble Metal Particle Precursor Dispersion>

The noble metal particle precursor dispersion used in the method for producing a supported catalyst particle of the present invention may be, for example, produced by one of the following methods:

(1) a method comprising reacting an acidic solution of a noble metal compound with a basic solution in a reactor in which a reaction field clearance is set to a predetermined range (Method 1), or (2) a method comprising mixing and reacting an acidic solution of a noble metal compound with a basic solution, and thereafter, stir-processing in a high-speed mixer (Method 2).

(Reactor in which a Reaction Field Clearance is Set to a Predetermined Range)

Method 1 is a method of controlling the average particle size and particle size distribution of the obtained noble metal particle precursor, by setting the reaction field clearance to a predetermined range when reacting an acidic solution of the noble metal compound with a basic solution, to produce the noble metal particle precursor.

The reactor may comprise, for example, an appropriate clearance setting member, whereby the reaction field clearance may be set to a predetermined range.

An acidic solution of a noble metal compound and a basic solution are introduced into such a reaction field and reacted. The introduced acidic solution of the noble metal compound and basic solution are reacted in the reaction field in a predetermined clearance, and are discharged from the reaction field thereafter. Since the reaction field clearance is set to a constant value, in the case where an insoluble component is generated from the reaction of the acidic solution of the noble metal compound and the basic solution, the particle size of the insoluble component is limited by the reaction field clearance and any overgrowth is thus suppressed.

In Method 1 of the methods for producing a noble metal particle precursor dispersion of the present invention, when an acidic solution of a noble metal compound (for example, an inorganic acid salt of a noble metal) is reacted with a basic solution (for example, an aqueous solution of a nitrogen-containing organic compound), by using such a reactor, the particle size of the noble metal particle precursor (for example, a hydroxide of the noble metal) contained in the obtained dispersion is controlled within a desired range.

The clearance adjustment member of the reactor may be, for example, two flat plates, a combination of a flat plate and a corrugated plate, or a thin pipe.

In the case where the clearance adjustment member consists of two flat plates, by arranging the two flat plates at a predetermined interval, the gap between the two flat plates becomes a reaction field, the distance between the two flat plates acts as the reaction field clearance. Slits may be formed in at least one of the flat plates. The two flat plates may be relatively rotated or translated during the reaction. The planar form of the flat plates is not particularly limited and may be in any shape, for example, a rectangle, a circle (disk), or a polygon.

In the case where the clearance adjustment member consists of a combination of a flat plate and a corrugated plate, by arranging these plates in contact with each other, the concave portion of the corrugated plate becomes a reaction field, and the depth of the concave portion acts as the reaction field clearance. The flat plate and the corrugated plate may be relatively rotated or translated during the reaction. The planar form of the flat plate and the corrugated plate may be in any shape, for example, a rectangle, a circle (disk), or a polygon.

In the case where the clearance adjustment member consists of a thin pipe, the inner portion of the thin pipe becomes a reaction field, and the inner diameter of the thin pipe acts as the reaction field clearance.

The reaction field clearance may be, for example, 1 μm or greater, 2 μm or greater, 4 μm or greater, 6 μm or greater, 8 μm or greater, 10 μm or greater, 15 μm or greater, 20 μm or greater, 25 μm or greater, or 30 μm or greater. This reaction field clearance may be, for example, 50 μm or less, 45 μm or less, 40 μm or less, 35 μm or less, 30 μm or less, 25 μm or less, or 20 μm or less.

The reactor in which a reaction field clearance is set to a predetermined range can include, for example, a microreactor having an appropriate clearance adjustment member. The reactor may be a commercially available product.

(High-Speed Mixer)

Method 2 is a method of controlling the average particle size and particle size distribution of the noble metal particle precursor after dispersion, by applying a strong shear force to the noble metal particle precursor generated as large particle-size particles by the reaction of an acidic solution of the noble metal compound and a basic solution to disperse the noble metal particle precursor.

In the method using a high-speed mixer, a reaction solution containing particles of the noble metal particle precursor, generated by the reaction of the acidic solution of the noble metal compound and the basic solution, is introduced into the stirring tank of the mixer. The reaction solution is then stirred at high speed. The particles of the noble metal particle precursor contained in the reaction solution are pressed against the container inner wall by centrifugal force, and the relative movement thereof with respect to the container inner wall is suppressed. Since the solvent (dispersion medium) in the reaction solution continues to be moved by the stirring operation and continues to spin as a liquid flow, strong stress is applied to the particles of the noble metal particle precursor pressed against the container inner wall by the spinning liquid flow. The noble metal particle precursor particles having a large particle size are dispersed by strong shear force of this stress, and are thus controlled to have the predetermined average particle size and particle size distribution of the present invention.

A high-speed mixer with a peripheral speed of 6 m/sec or greater can be used as the high-speed mixer. A commercially available product may be used as the high-speed mixer.

<Acidic Solution of Noble Metal Compound>

An acidic solution of a noble metal compound used in Methods 1 and 2 may be a solution in which a noble metal is dissolved in an appropriate solvent.

The noble metal compound may be an inorganic acid salt of a desired noble metal, and may be specifically a hydrochloride, a nitrate, a phosphate, a sulfate, a borate, or a hydrofluoride of a noble metal selected from, for example, rhodium, palladium, and platinum.

The solvent in the acidic solution of the noble metal compound may be the same as the dispersion medium of the desired noble metal particle precursor dispersion.

The pH of the acidic solution of the noble metal compound is less than 7.0, and may be, for example, 6.0 or less, 5.0 or less, 4.0 or less, 3.0 or less, 2.0 or less, or 1.0 or less, and may be, for example, 0.1 or greater, 0.3 or greater, 0.5 or greater, 0.7 or greater, or 1.0 or greater.

<Basic Solution>

A basic solution used in Methods 1 and 2 may be a solution in which a base, specifically an organic base, is dissolved in an appropriate solvent.

The organic base may be a nitrogen-containing organic compound, preferably selected from an amine compound and a heterocyclic compound comprising a nitrogen atom as a ring-constituting atom. Specifically, for example, the amine compound can be trimethylamine, triethylamine, tetramethylammonium hydroxide, tetraethylammonium hydroxide, trimethylamine, triethylamine, or dimethylaminonaphthalene; and the heterocyclic compound comprising a nitrogen atom as a ring-constituting atom can be pyridine or diazabicycloundecene.

The solvent in the basic solution may be the same as the dispersion medium of the desired noble metal particle precursor dispersion.

The pH of the basic solution is greater than 7.0, and may be, for example, 8.0 or greater, 9.0 or greater, 10.0 or greater, 11.0 or greater, 12.0 or greater, or 13.0 or greater, and may be, for example, 14.0 or less, 13.5 or less, 13.0 or less, 12.5 or less, or 12.0 or less.

<Reaction of Acidic Solution of Noble Metal Compound and Basic Solution>

The noble metal particle precursor dispersion obtained by reacting an acidic solution of a noble metal compound with a basic solution may be basic (alkaline) or acidic.

In the case of preparing a basic noble metal particle precursor dispersion, when reacting the acidic solution of the noble metal compound with the basic solution, the use ratio of both liquids, in terms of a molar ratio of the base to the noble metal compound (base/noble metal compound), may be set to, for example, 2 or greater, 5 or greater, 10 or greater, 15 or greater, or 20 or greater, and may be set to, for example, 100 or less, 75 or less, 50 or less, 40 or less, 30 or less, or 20 or less.

In the case of preparing an acidic noble metal particle precursor dispersion, the use ratio of both liquids, in terms of a molar ratio of the base to the noble metal compound (base/noble metal compound) is preferably set to 1 or less.

The reaction temperature when reacting the acidic solution of the noble metal compound with the basic solution, may be appropriately set to, for example, within the range of −10° C. to 100° C., for example, room temperature. The reaction time may be appropriately set to, for example, within the range of 0.1 seconds to 1 hour, in accordance with the type of reactor to be used.

<Contacting Oxide Carrier Particle with Noble Metal Particle Precursor Dispersion and Firing Thereafter>

When producing the supported catalyst particle of the present invention, the contacting between the oxide carrier particle and the noble metal particle precursor dispersion and the firing after the contacting may be carried out following publicly known methods.

EXAMPLES

Example 1

<Preparation of Noble Metal Particle Precursor Dispersion>

0.2 g of rhodium(III) nitrate was added to and dissolved in 50 mL of ion exchange water, and an acidic solution (pH 1.0) of a noble metal compound was prepared.

An aqueous solution of tetraethylammonium hydroxide (concentration at 175 g/L, pH 14) as an organic basic solution was prepared.

In the reaction of an acidic solution of the noble metal compound and the organic basic solution:

Using a reactor having two flat plates as a clearance adjustment member, the above acidic solution of the noble metal compound and organic basic solution were introduced into a reaction field set to a clearance of 10 μm. By this method, both liquids were reacted under the condition of the molar ratio (TEAH/RN) of tetraethylammonium hydroxide (TEAH) and rhodium nitrate (TN) set to 18, and the noble metal particle precursor dispersion was prepared. The pH of the obtained noble metal particle precursor dispersion was 14. The median diameter (D50) of the noble metal particle precursor contained in the obtained noble metal particle precursor dispersion was measured to be 2.0 nm by dynamic light scattering (DLS).

<Preparation and Evaluation of Supported Catalyst Particle>

(1) Particle Size of Noble Metal Particles

Rhodium supported catalyst particles for particle size measurement, having a supported amount of 0.5% by mass, were obtained by bringing the noble metal particle precursor dispersion in contact with alumina followed by firing, such that the ratio of the mass of the noble metal (rhodium) to the mass of alumina was 0.5% by mass.

The particle size distribution of rhodium particles supported on the obtained supported catalyst particles was examined by observation with a scanning transmission electron microscope (STEM). The average particle size of the rhodium particles supported on the supported catalyst particle was 1.40 nm with a particle size standard deviation σ of 0.48 nm.

(2) Catalytic Performance (NOx Purification T50)

Rhodium supported catalyst particles having a supported amount of 0.2 by mass for performance evaluation were obtained by bringing the noble metal particle precursor dispersion in contact with zirconia followed by firing, such that the ratio of the mass of the noble metal (rhodium) to the mass of zirconia was 0.2% by mass.

2 g of the obtained rhodium supported catalyst particles for performance evaluation were introduced into a catalytic activity evaluation device, and were subjected to pretreatment under stoichiometric conditions and endurance. Thereafter, model exhaust gas was flowed while the catalyst bed temperature was raised to carry out an exhaust gas purification test. The temperature at which the NOx purification rate is 50% (NOx purification T50) was found to be 319° C. The conditions for endurance and exhaust gas purification testing were as follows.

(Endurance)

Gas compositions (based on mass): CO=2%, $N_2$=the balance and $O_2$=5%, $H_2O$=10%, $N_2$=the balance; switched every 5 minutes Endurance temperature: 1,000° C.

Endurance time: 10 hours (Catalytic Performance Evaluation)

Gas composition (based on mass): CO=5,200 ppm, NO=3,200 ppm, $C_3H_6$=carbon atom equivalent of 3,000 ppm; $O_2$=0.53%, $CO_2$=14%, $H_2O$=3%, $N_2$=the balance Gas flow rate=15 L/min The surface area of the rhodium metal of the rhodium supported catalyst particles for performance evaluation after endurance was measured by CO-pulse method. The average particle size was calculated to be 14 nm.

Example 2

<Preparation of Noble Metal Particle Precursor Dispersion>

A noble metal particle precursor dispersion was prepared in the same manner as in the <Preparation of noble metal particle precursor dispersion> of Example 1, except that the molar ratio (TEAH/RN) during the reaction of the acidic solution of the noble metal compound and the organic basic solution was adjusted to 24. The pH of the obtained noble metal particle precursor dispersion was 14, and the median diameter (D50) of the noble metal particle precursor was 2.4 nm.

<Preparation and Evaluation of Supported Catalyst Particles>

(1) Particle Size of the Noble Metal Particles

Rhodium supported catalyst particles having a supported amount of 0.5% by mass for particle size measurement were prepared in the same manner as in Example 1, except that the above obtained noble metal particle precursor dispersion was used. The particle size distribution of the rhodium particles was examined in the same manner as in Example 1. The resulting average particle size of the rhodium particles was 1.47 nm with a particle size standard deviation σ of 0.59 nm.

(2) Catalytic Performance (NOx Purification T50)

Rhodium supported catalyst particles for performance evaluation, having a supported amount of 0.2% by mass, were prepared in the same manner as in Example 1, except that the above obtained noble metal particle precursor dispersion was used. NOx purification T50 was examined in the same manner as in Example 1. The resulting NOx purification T50 was 327° C.

Comparative Example 1

Rhodium supported catalyst particles having a supported amount of 0.5% by mass for particle size measurement and rhodium supported catalyst particles having a supported amount of 0.2% by mass for performance evaluation were each prepared in the same manner as in Example 1 except that an acidic solution of a noble metal compound was used in place of the noble metal particle precursor dispersion, and were evaluated in the same manner as in Example 1.

The average particle size of rhodium particles in the rhodium supported catalyst particle for particle size measurement was 0.7 nm. The NOx purification T50 measured using the rhodium supported catalyst particles for performance evaluation was 330° C. The average particle size of rhodium particles calculated from the surface area by the CO-pulse method of the rhodium supported catalyst particle for performance evaluation after endurance was 18 nm.

Comparative Example 2

Rhodium supported catalyst particles having a supported amount of 0.5% by mass for particle size measurement and rhodium supported catalyst particles having a supported amount of 0.2% by mass for performance evaluation were each prepared in the same manner as in Example 1, except that the reaction of the acidic solution of the noble metal compound and the organic basic solution was carried out in a beaker, without using a reactor having a clearance adjustment member, and then evaluated.

The average particle size of rhodium particles in the rhodium supported catalyst particle for particle size measurement was 1.42 nm with a particle size standard deviation σ of 0.94 nm. The NOx purification T50 measured using the rhodium supported catalyst particles for performance evaluation was 335° C. The average particle size of rhodium particles calculated from the surface area by the CO-pulse method of the rhodium supported catalyst particle for performance evaluation after endurance was 17 nm.

The above results are shown in Table 1.

TABLE 1

| | Noble metal particle precursor dispersion | | | | | Rh particle supported catalyst particle | | | | |
| | | | | | | Rh particle | | | | |
| | | | | | | Particle size and | | | | |
| | Preparation method of noble metal particle precursor dispersion | | | | Median diameter of noble | | particle size distribution (STEM observations) | | | Particle size of Rh particles |
| | Acidic solution of noble metal compound | Basic solution | TEAH/RN (molar ratio) | Reactor | metal particle precursor (nm) | Supported amount (% by mass) | Average particle size (nm) | Standard deviation (nm) | NOx purification T50 (° C.) | by CO-pulse method after endurance (nm) |
| Ex. 1 | $Rh(NO_3)_3$ aq. | $(C_2H_5)_4NOH$ aq. | 18 | Reactor with clearance adjustment member | 2.0 | 0.2 | 1.40 | 0.48 | 319 | 14 |
| Ex. 2 | $Rh(NO_3)_3$ aq. | $(C_2H_5)_4NOH$ aq. | 24 | Reactor with clearance | 2.4 | 0.2 | 1.47 | 0.59 | 327 | 17 |

TABLE 1-continued

| | Noble metal particle precursor dispersion | | | | | Rh particle supported catalyst particle | | | | |
| | Preparation method of noble metal particle precursor dispersion | | | | Median diameter of noble metal particle precursor (nm) | Rh particle | | | | Particle size of Rh particles by CO-pulse method after endurance (nm) |
| | | | | | | Particle size and particle size distribution (STEM observations) | | | | |
| | Acidic solution of noble metal compound | Basic solution | TEAH/RN (molar ratio) | Reactor | | Supported amount (% by mass) | Average particle size (nm) | Standard deviation (nm) | NOx purification T50 (° C.) | |
|---|---|---|---|---|---|---|---|---|---|---|
| Comp. Ex. 1 | Rh(NO$_3$)$_3$ aq. | — | — | adjustment member | (Solution) | 0.2 | 0.70 | — | 330 | 18 |
| Comp. Ex. 2 | Rh(NO$_3$)$_3$ aq. | (C$_2$H$_5$)$_4$NOH aq. | 18 | Beaker | 2.0 | 0.2 | 1.42 | 0.94 | 335 | 17 |

FIG. 1 shows a graph illustrating the particle size distributions (cumulative frequencies) of rhodium particles on the rhodium supported catalyst particles obtained in Examples 1 and 2 and Comparative Example 2. In FIG. 1, the cumulative frequencies of particles having a particle size of less than 1.0 nm of Examples 1 and 2 are compared with those of Comparative Example 2, using actual measured values at the particle size of 0.9 nm as an index. It was confirmed that in the rhodium particles in the supported catalyst of Comparative Example 2, particles having a particle size of less than 1.0 nm accounted for about 18% of the total, whereas in Examples 1 and 2, particles having a particle size of less than 1.0 nm were controlled to about 3%. Further, it was verified that in the supported catalysts of Examples 1 and 2, the proportion of large particle-size particles having a particle size of about 2.0 nm or greater was reduced as compared to Comparative Example 2.

FIG. 2 shows STEM images of the rhodium supported catalyst particles obtained in Example 1 and Comparative Example 2. The rhodium particles on the supported catalyst can be confirmed as white dots in the images of FIG. 2. It was confirmed that in the supported catalyst of Comparative Example 2 shown in FIG. 2(b), the particle size of the rhodium particles varied, whereas in the supported catalyst of Example 1 shown in FIG. 2(a), the particle size was comparatively small and uniform.

The invention claimed is:
1. A supported catalyst particle, comprising
   an oxide carrier particle and noble metal particles supported on the oxide carrier particle,
   wherein a noble metal constituting the noble metal particles is rhodium,
   the noble metal particles have a mass of 5% by mass or less based on the mass of the oxide carrier particle,
   the noble metal particles have an average particle size of 1.0 nm to 2.0 nm with a particle size standard deviation σ of 0.8 nm or less, as measured by observation with a transmission electron microscope, and
   a presence ratio of noble metal particles having a particle size of less than 1.0 nm is 5% by mass or less with respect to the total mass of the noble metal particles.
2. The supported catalyst particle according to claim 1, wherein the noble metal particles have a particle size standard deviation σ of 0.6 nm or less.
3. The supported catalyst particle according to claim 1, wherein the noble metal particles have an average particle size of 1.2 nm to 1.8 nm.
4. The supported catalyst particle according to claim 1, wherein the noble metal particles have a mass of 1.0% by mass or less based on the mass of the oxide carrier particle.
5. The supported catalyst particle according to claim 1, wherein the oxide carrier particle is a particle of an oxide of one or more metals selected from titanium, zirconium, cerium, and aluminum.

* * * * *